United States Patent [19]

Swanson et al.

[11] Patent Number: 4,459,313
[45] Date of Patent: Jul. 10, 1984

[54] METHOD FOR MAKING A PROCESS CHEESE ANALOG

[75] Inventors: Arthur M. Swanson, Madison; Edwin E. Wohlt, Fremont; Robert J. Swanson, Sun Prairie, all of Wis.

[73] Assignee: A. M. Swanson & Associates, Inc., Madison, Wis.

[21] Appl. No.: 323,702

[22] Filed: Nov. 20, 1981

Related U.S. Application Data

[63] Continuation of Ser. No. 212,159, Dec. 2, 1980, abandoned, which is a continuation of Ser. No. 106,260, Dec. 21, 1979, abandoned, which is a continuation of Ser. No. 883,468, Mar. 6, 1978, abandoned.

[51] Int. Cl.³ .............. A23C 20/00; A23C 21/02; A23C 21/04; A23C 21/06
[52] U.S. Cl. ................................. 426/39; 426/41; 426/42; 426/104; 426/582; 426/583; 426/585
[58] Field of Search .............. 426/582, 583, 585, 39, 426/41, 42, 104

[56] References Cited

U.S. PATENT DOCUMENTS

| | | | |
|---|---|---|---|
| 1,634,410 | 7/1927 | Eldredge | 426/582 |
| 1,918,595 | 7/1933 | Frederiksen | 426/582 |
| 3,397,994 | 8/1968 | Elenbogen et al. | 426/582 X |
| 3,716,377 | 2/1973 | Bratland | 426/582 |
| 3,732,110 | 5/1973 | Pontecorvo | 426/582 |
| 3,780,182 | 12/1973 | Johnson et al. | 426/582 X |
| 3,814,825 | 6/1974 | Gilmartin et al. | 426/582 |
| 3,843,808 | 10/1974 | Ziccarelli | 426/583 |
| 3,899,605 | 8/1975 | Schaap | 426/582 |
| 3,911,143 | 10/1975 | Colmey et al. | 426/583 |
| 4,197,322 | 4/1980 | Middleton | 426/582 X |

OTHER PUBLICATIONS

Currently pending application of Swanson et al., Ser. No. 881,001, filed Feb. 24, 1978.

*Primary Examiner*—Marc L. Caroff
*Attorney, Agent, or Firm*—Isaksen, Lathrop, Esch, Hart & Clark

[57] ABSTRACT

A natural cheese analog is produced by coagulating a cheese-like curd from a mixture of conditioned liquid cheese whey and a dry casein material to form a substantially fat-free cheese analog. The fat-free cheese analog is comminuted; further processed by adding a selected fat, preferably in the form of vegetable oils, and adding emulsifiers and other ingredients; and then heated to a temperature in the range of 155°–205° F. until it forms a fluent mass which is subsequently cast into any desired shape. The resultant product is a process cheese analog having any desired flavor, texture and fat content.

11 Claims, No Drawings

4,459,313

METHOD FOR MAKING A PROCESS CHEESE ANALOG

REFERENCE TO RELATED APPLICATION

This is a continuation of co-pending application Ser. No. 212,159, filed on Dec. 2, 1980, now abandoned, which was a continuation of then pending application Ser. No. 106,260, filed Dec. 21, 1979, now abandoned, which was a continuation of then pending prior application Ser. No. 883,468, filed Mar. 6, 1978 now abandoned.

BACKGROUND OF THE INVENTION

1. Field of the Invention

This invention relates to foodstuffs in general, and, in particular, to a process cheese analog resembling natural process cheese in body, texture, and flavor and to the method of manufacturing such a process cheese analog.

2. Description of the Prior Art

Process cheese is conventionally manufactured from natural cheese through a cooking of the natural cheese together with the addition thereto of various spices, flavorings, and emulsifiers. Since the main ingredient in this processing is mostly natural cheese, the resultant process cheese conventionally contains all the fat component of natural cheese itself, together with the other ingredients as they are added, and the cost of the process cheese is usually determined by the relatively high cost of natural cheese.

Process cheese-like products are conventionally negregated into three categories depending on their fat and moisture contents, process cheese, process cheese food, and process cheese spread. Process cheese is defined to have the highest fat content and the lowest moisture content, process cheese spread is defined to have the lowest fat content and the highest moisture content, and process cheese food is defined to be intermediate in both fat and moisture content.

Natural cheese itself is conventionally manufactured from whole milk, skim milk, nonfat dry milk, cream or combinations thereof. The milk product is first acidified, usually using a lactic acid producing bacterial culture, after which a coagulum is then formed in the acidified milk by adding thereto a milk coagulating enzyme. The resultant custard-like coagulum or curd is then cut into numerous particles and heated to facilitate the separation of whey from the curd. The whey is then removed from the curd, usually by simple drainage, and the curd is salted and pressed into forms to produce solid blocks of cheese. The cheese is then cured in temperature controlled conditions until the desired texture and flavor is achieved. The whey by-product of the cheese making process is often considered a waste product and is available in excess in all cheese making regions. Disposal of the whey is often a pollution problem and many efforts have been undertaken to recover the nutrients contained in this whey. The whey usually also contains a significant amount, in the range of 7 to 10 percent, of the fat component contained in the original milk product. This fat is primarily removed from the milk during the curd cutting process. The fat is trapped in curd in small particles which are wholly contained within the curd particles. Cutting the curd exposes many of the fat particles which are then leached out with the whey. The loss of this fat is a significant monetary factor and represents the loss of a considerable portion of the recoverable material from the milk and yet is completely unavoidable during conventional cheese manufacture.

The prior art contains many examples of foodstuffs utilizing therein materials derived from waste cheese whey. Some of these processes involve precipitation of remaining solids from the whey while others use the liquid whey combined with other nutritive ingredients to make diverse products. Examples of such foodstuffs and the methods for their manufacture are shown in U.S. Pat. Nos. 3,421,897; 3,466,176; 3,704,136; 3,780,182; 3,618,109; 3,922,375; 3,943,264; 3,956,520; and 4,036,999.

Another product of commerce often produced from whole milk is dry casein material. The casein is produced from milk through the direct acidification of the fat-free portion of a milk product until a curd forms. The casein is normally formed into this curd through the use of mineral, i.e., hydrochloric or sulphuric acids, but may also be created through the use of lactic acid generated in a milk culture by microorganisms. The casein curd is repeatedly washed to remove the remaining lactose and salt therefrom after which the washed curd is passed through a press to remove water therefrom and is then passed through hot driers which reduce the water content of the curd to approximately 10 percent. The dried curd is then reduced to the desired size by grinding to produce a dry powder or granular product. This product consists either of dry casein alone or as casein combined with an alkaline earth, such as calcium, to produce a caseinate compound, such as calcium caseinate. These dry casein materials, containing most of the protein constituents of whole milk, can be easily and economically stored and shipped and are normally commercially available throughout the world at a lower price per-pound-protein than whole milk. Because of its cost advantage numerous processes have been developed to fabricate cheese-like products or cheese extenders from casein materials. However, these cheese-like products or extenders do not satisfactorily resemble either natural cheese or processed cheese and are readily distinguishable therefrom by taste and texture. Examples of such products and the methods for their manufacture are shown in U.S. Pat. Nos. 3,397,994; 3,397,995; 3,720,520; 3,886,300; 3,917,854; 3,922,374; 3,941,891; and 4,016,298.

It has also been proposed in at least one instance to use whey as a carrier for a selected fat, with the whey then being combined with a non-fat portion of milk and the resultant combination being used as a feed substance in a cheese making procedure. Such a procedure, which substitutes for the fat normally found in milk, is described in U.S. Pat. No. 3,899,605. The problem with this procedure is that liquid skim milk or other liquid milk fraction must still be used in the manufacture thereby losing the cost advantage possible by using a dry powered casein material. This procedure also introduces the fat into the cheese at the very start of the procedure. Other methods for substituting emulsified fats in milk solutions for use in making cheese are disclosed in U.S. Pat. Nos. 3,716,377 and 3,889,004.

There have been at least some attempts to introduce oils into cheese-like products during some sort of processing operation, as exemplified by U.S. Pat. Nos. 3,814,825 and 3,929,892. Neither of these processes involves the production of a fat-free cheese analog to which fats may be added during processing, however.

SUMMARY OF THE INVENTION

The present invention is summarized in that a method of making a process cheese analog includes the steps of producing a substantially fat-free natural cheese analog by forming a cheese-like curd in a mixture of dry casein material and conditioned liquid cheese whey, comminuting the fat-free cheese analog, adding a quantity of a selected fat to the comminuted cheese analog, heating the fat and cheese analog mixture until it forms a fluent mass, and casting the fluent mass into any desired shape.

It is an object of the present invention to provide suc a method in which the type and amount of fat in the finished product can be accurately controlled and determined.

It is another object of the present invention to produce a process cheese analog that resembles process cheese in texture, flavor and body, but that is formed of ingredients priced significantly cheaper than those of natural process cheese.

It is yet another object of the present invention to provide a method for making such a process cheese analog that is adaptable to producing a wide variety of types of flavors.

It is an advantageous feature of the present invention that the process cheese analog produced has a fat and moisture content similar to process cheese spread, yet is similar in body, texture and flavor to process cheese.

Other objects, advantages and features of the present invention will become apparent from the following specification.

DETAILED DESCRIPTION

The method of producing a process cheese analog according to the present invention begins with the production of a specially adapted fat-free natural cheese analog which can then be processed into the process cheese analog. The first step in producing the low-fat natural cheese analog is to begin with a quantity of liquid whey. The liquid whey for use in the present method may be sweet or acid whey or reconstituted whey solids from any conventional cheese-making process, may be modified by demineralization and may or may not have been subjected to a lactose removal process. The preferred whey material, however, is fresh sweet cheese whey. The liquid whey stock material is first heated to inactivate any enzyme cultures or other agents which may be remaining in the whey from the cheese-making process from which the whey is derived. Typically the whey is heated to a temperature on the order of 165° F. for some short time, typically less than 1 minute.

To the liquid whey there is then added a quantity of dry casein material, which is added while the whey is continually agitated. The dry casein material for use in this method may be dry casein produced by any of the conventionally used commercial methods for producing casein material. Suitable dry casein products include lactic acid casein produced by bacterial culture acidification of skim milk, and mineral acid casein produced by direct acidification of skim milk using hydrochloric, sulphuric, or other mineral acids. Each of these acidification techniques causes the casein complex proteins normally found as a constituent of whole milk to precipitate from the milk. The casein material produced by this precipitation is then dried and milled to produce a powdered or granular dry casein product, this dry casein material being a conventional product of commerce in the chemical industry. The dry casein material may also be chemically combined with such alkali metal or alkaline earth metals as may be desired, as for instance with calcium hydroxide to produce calcium caseinate, with these mineral casein combinations also being useable in the present process. The term dry casein material as used herein is meant to refer to this powdered or granular product of commerce as distinguished from the casein protein complex as normally found in whole milk or other milk fractions, and as also distinguished from other milk solids, such as nonfat dry milk, which are produced by mere water removal or dehydration techniques, such as spray drying, and usually include other substances, such as lactose, not found in dry casein materials except in insignificant quantities.

Dry casein material is a material that is normally particularly insoluble in acidic solutions, having its point of least solubility at a pH of 4.6. To induce the dry casein material to dissolve into the whey medium, the whey medium must be conditioned with a conditioning agent to increase the pH of the solution. The preferred conditioning agents are alkali metal hydroxides or alkaline earth metal hydroxides, or combinations thereof, such as sodium hydroxide, NaOH, calcium hydroxide, $Ca(OH)_2$, or a combination of the two. The conditioning agent is preferably added to the whey while the dry casein material is being suspended in the whey by agitation, until the pH of the medium is raised to within the range of 6.8 to 7.3, preferably being about 6.9. With the pH maintained at this level and with the moderate blending temperature, typically 80° to 90° F., and medium agitation, it has been found that the dry casein material disperses into the conditioned liquid whey forming a stable suspension. The calcium hydroxide is particularly suited for the conditioning of the whey mixture since the dissolved calcium in the whey combines with the dissolved casein complex to form calcium caseinate in situ in the mixture. An aqueous solution of calcium chloride $CaCl_2$, may also be added to the mixture to increase the concentration of calcium ions therein.

The mixture is then next acidified using a pH adjusting mechanism, either through direct mineral acidification, or through the natural lactic acid acidification produced by inoculating the mixture with a cheese starter culture. Preferably such acidification is accomplished through the use of a cheese starter culture, as with natural cheese. With such a culture propagating in the medium, the pH is lowered into a range of 6.8 or less, with the preferred range being 6.3 to 6.5.

Following the acidification, a coagulating enzyme, of any of the types conventionally used in cheese-making, is added to the medium to bring about a coagulation process in the liquid mixture forming a continuous coagulum therein. Suitable coagulating enzymes include rennet, pepsin and fungal enzymes such as *Mucor miehei* or *Mucor pusillus,* or combinations thereof. The coagulum produced is then cut and heated to draw out whey therefrom, with the resultant whey being drained off the coagulum. The cheese-like curd then produced is salted and hooped and pressed similar to natural cheese curd to produce the substantially fat-free natural cheese analog.

The fat-free natural cheese analog is an intermediate product of the method of the present invention and can be stored in this form until such time as the processing steps are ready to begin. This fat-free natural cheese analog so produced is particularly adapted to the processing steps as detailed hereinafter.

The first step in processing the intermediate product fat-free cheese analog into the finished process cheese analog is to introduce the fat-free cheese analog into a cheese grinder. If it is desired to add to the fat-free cheese analog a quantity of natural cheese, the natural cheese can be introduced simultaneously into the cheese grinder. If any additional solid materials are to be added to the batch, they may also be added at this point, if desired, rather than at some later time as is preferable.

The comminuted batch is then introduced into a process cheese cooker and a quantity of a selected fat is added to the batch. The type and amount of the fat are selected so that the finished process cheese analog will have any desired fat content and any desired combination of polyunsaturated and saturated fats. Preferably the fat to be introduced is a vegetable oil and is preferably one having a high content of polyunsaturated fats and little or no cholestoral content. Suitable vegetable oils include corn oil, soybean oil, safflower oil, and cottonseed oil, and blends or combinations of these oils. One or mre of the oils may be partially hydrogenated, or all may be unhydrogenated. Also at this time any additional desired natural flavorings and/or seasonings, spices, and extracts may be added to the mixture. Typical seasonings and spices include salt, peppers, caraway, onion, paprika, and liquid smoke flavoring. Additionally at this step in the process, an emulsifying agent may be added to the mixture. Suitable emulsifying agents include di-sodium phosphate, tri-sodium phosphate, sodium citrate, mono- and diglycerides, sodium hexametaphosphate, and potassium aluminum phosphate. An amount of rework (previously processed cheese analog) may also be added here. The resultant mixtures of the fat-free cheese analog, the oils, the flavorings, and the emulsifying agents, is then subjected to direct steam heating, through an injection process, to bring the mixture to a temperature in the range of 155° to 205° F. with the preferred temperature range being 180° to 185° F. This temperature range is in contrast to the 165° to 175° range preferred for use with natural process cheese. If desired, this heating could also be accomplished by indirect heating. While being heated the mixture is subjected to continuous agitation. This heating and agitation is continued until such time as the mass resulting therefrom has a flowable, plastic fluent characteristic with the particular elasticity and plasticity of the material being determined by the time and temperature of the cook. This cooking also pasteurizes the mixture to ensure that the product is microbiologically safe for human consumption. If desired, a quantity of natural cheese or concentrated natural cheese flavoring may be added to the batch at this point, lowering the cooking temperature to that suitable for natural process cheese, i.e., 165° to 175° F. The moisture content of the batch can be tested and can then be adjusted to the desired level through the addition of water. The mass can then be removed from the cooker and cast into suitable molds, packages, or forms. After the product has cooled the resultant process cheese analog may be stored under refrigeration until ready for use.

The process cheese analog of the present invention has several significant advantages over natural process cheeses. One of the most significant is that the oil or fat constituent of the process cheese analog is not added until after the low-fat cheese analog itself is manufactured. Two significant advantages result from this factor. One is that while the low-fat natural cheese analog is in storage, a significant amount of monetary investment in inventory is avoided, since the relatively expensive oil is not in the low-fat cheese analog that is in storage until the processing step. The second is that by addition of the oil only after the natural cheese analog has been coagulated and formed, the loss of oils such as would take place during the curd cutting step is avoided. This loss of fat or oil, typically in the range of 7 to 10 percent of total fat content represents a significant loss of relatively costly material that was heretofore unavoidable, and yet is entirely avoided by the method of the present invention. Furthermore, the exact percentage quantity, and the exact type of the oil or fat in the resultant process cheese analog can be selected with a relatively high degree of accuracy since the amount of oil or fat to be added during the processing step can be exactly controlled.

In addition to the other ingredients, vitamins and minerals, alone or in combinations, may also be added to the process cheese analog during its manufacture. The vitamins may be either fat or water soluble, and the minerals may be those termed as either macro or micro trace elements in human nutrition. The vitamins and minerals introduced may be similar in nature to those found in natural pasteurized process cheese, or they may be of a different nature or increased in quantity over these found in natural products.

Fortification of the process cheese analog with vitamins and minerals in combination with significantly lower levels of saturated fat, cholesterol, and salt (sodium chloride) allows for the fabrication of new and dietarily desirable foodstuffs, using the method of the present invention, for persons on a variety of restricted diets. Despite such manipulation of formulation, the products produced closely resemble similar natural products in texture, flavor, and color with an absence of restricted ingredients.

The processing procedure itself is significantly different from conventional cheese processing. First of all, higher temperatures, preferably in the range of 180° to 185° F., are required to thoroughly process the cheese analog so that it will not have a granular character when finished. Becuase of the unique character of the fat-free cheese analog used in this procedure, it has been found that, several other adjustments to conventional processing methodology are required to obtain a suitable cheese-like process cheese analog.

For instance, the effects of the various emulsifiers are significantly and surprisingly different from their effects on natural process cheese. In natural process cheese sodium citrate is used to produce a firm body with reduced meltability, di-sodium phosphate is used for softer body and increased meltability, and tri-sodium phosphate is added, usually with di-sodium phosphate, for even softer body and more meltability. In the process cheese analog of the present invention, it has been discovered that these effects are completly reversel, with sodium citrate making the product more meltable and with di-sodium phosphate and tri-sodium phosphate making the product progressively less meltable.

The novel method of the present invention thus produces a process cheese analog which resembles in texture, taste and body natural process cheese and in some instances natural cheese. This process cheese analog has a moisture content within the range of 40 to 60 percent, but is preferably about 46 to 48 percent, a moisture content normally associated with process cheese spread. Yet the process cheese analog resembles more closely natural process cheese in body and feel rather than process cheese spread. Loaves of the process cheese analog can be sliced at room temperature and stacked on end for several hours and will still retain their shape and body with the slices being readily separable. This body and texture is achieved without the use of any filler starches or gums as would otherwise be used and the product has none of the "rubbery" feel often associated with simulated process cheese-type products. The product does have the "melt in the mouth" texture similar to natural process cheese that is readily recognizable by cheese makers, this characteristic being a highly advantageous feature achieved in an unexpected manner.

The process cheese analog may be further treated to produce a process cheese spread analog. The relative proportions of the ingredients in the processing stage would be altered, including more oil and/or moisture content and decreasing the amount of the low-fat cheese analog. While the process cheese spread analog could be produced following the processing method as set forth heretofore, it may also be produced by the following procedure. The ingredients would be mixed and then cooked under pressure at high temperature, typically 225° to 275° F., after which the batch is rapidly cooled under a vacuum to 150° to 175° F. The resultant product is then cast into forms of various shapes and sizes, such as bars, wedges and circular pieces, with the product then being hermetically sealed. Due to the high temperature of such processing, the product produced is substantially free of microorganisms and may be stored and handled without refrigeration.

The following are examples of the performance of the method of the present invention but it is understood that the present invention is not limited to the particular methods and product examples and constituents described therein, but embraces all variations therein as come within the scope of the claims which follow thereafter.

EXAMPLE 1

Preparation of process cheese analog 20,000 lbs. of liquid cheese whey was first heated to 165° F. for 20 seconds to inactivate any residual enzyme. The whey was then cooled to 80° to 90° F. and introduced into a 37,000 lb. Damrow Double-O cheese vat and held under agitation as 1,320 lbs. of New Zealand lactic acid dry casein was added thereto. 5 lbs. of 40 percent NaOH aqueous solution was added to the mixture together with approximately 45 lbs. of powdered Ca(OH)$_2$ in aqueous solution to bring the mixture pH to 6.9 to solubilize the casein material. The mixture was then heated to 120° F. and cooled to 90° F. in preparation for the addition of the starter culture.

The starter culture had been previously prepared by mixing 100 lbs. lactic acid starter culture host medium from Dederick Co. into 900 lbs. of water with the liquid host medium produced then being super-pasteurized at 200° F. for 30 minutes and then cooled to 86° F. To this host medium a concentrated cheese starter culture sold under the tradename Marstar by Marschall Dairy Laboratories was added. 800 lbs. of the resultant cheese starter culture was added to the whey and casein mixture.

Following the addition of the starter culture the acidity of the mixture was lowered until the pH 6.4 was reached after which 160 fl. ozs. of aqueous calcium chloride (CaCl$_2$) and 80 fl. ozs. of a coagulating enzyme, Emperase (*Mucor pusillus*), were added. The mixture was then held at 88° to 90° F. until a firm coagulum was formed. When the coagulum was judged properly set, it was cut using the curd knives in the vat and the resulting curd particles were heated slowly over a period of 20 minutes to 103° F. while concurrently agitated. The batch was then transferred to a curd table so that the curd would settle while the whey was drawn off. The curd was continually stirred to keep the curd particles loose while the whey was drained. When sufficient whey was drained, the curd was salted using 2¾ lbs. of salt per 100 lbs. of curd, and the curd was packed in polyethylene lined 500 lb. capacity steel barrels and allowed to drain overnight. The following day the barrels were uprighted and were stored at 40° F. until ready for use. This batch produced approximately 3,100 lbs. of fat-free natural cheese analog.

After approximately 30 days storage at 45° F., 14 lbs. of the fat-free cheese analog were comminuted in a cheese grinder and introduced into a laboratory scale process cheese cooker. To this material was added the following:

| | |
|---|---|
| liquid corn oil | 2 lbs., 10 ozs. |
| partially hydrogenated soybean, cottonseed and palm oils | 1 lb., 6 ozs. |
| sodium citrate | 1½ ozs. |
| non-fat dry milk | 8 ozs. |
| dried whey | 8 ozs. |
| salt | 5 ozs. |
| sorbic acid | 1 oz. |
| natural flavors and spices | 16 grams |

This mixture was then heated by direct steam injection to 180° to 185° F. and held under continuous agitation until a homogeneous mixture was created at which time the following were added:

| | |
|---|---|
| 270-day-old comminuted cheddar cheese | 1 lb., 6 ozs. |
| 30-day-old comminuted cheddar cheese | 1 lb., 13 ozs. |
| Water | 5¼ ozs. |

The resultant fluent thermoplastic mass was cast in 5-lb. rectangular loaf molds and cooled to approximately 45° F. causing the mass to set into a form retaining state. The cooled product possessed the smooth, firm texture and flavor associated with natural process American-style cheese.

EXAMPLE 2

Preparation of mild process cheese analog 244 lbs. of the fat-free cheese analog as described in Example 1 were comminuted in a process cheese grinder and introduced into a Dammrow process cheese cooker. To this material was added:

| | |
|---|---|
| liquid corn oil | 45 lbs. |
| partially hydrogenated soybean and palm oils | 25 lbs. |
| sodium citrate | 12¼ lbs. |
| rework (previously processed cheese analog) | 10 lbs. |
| non-fat dry milk | 8¾ lbs. |
| dried whey | 8¾ lbs. |
| salt | 5¼ lbs. |

| -continued | |
|---|---|
| sorbic acid | 1 lb. |
| natural flavors and spices | 10 ozs. |
| cheese color | 4 ozs. |

This mixture was heated by direct steam injection to 180° to 185° F. and held under continuous agitation until a homogeneous mixture was created at which time the following were added:

| 270-day-old ground cheddar cheese | 25 lbs. |
|---|---|
| 30-day-old cheddar cheese | 31¼ lbs. |
| water | 6 lbs. |

The resultant fluent thermoplastic mass was cast in 5-lb. rectangular loaf molds and cooled to approximately 45° F. causing the mass to set into a form retaining state. The cooled product possessed the smooth, firm texture and flavor associated with natural process American-style cheese.

EXAMPLE 3

Preparation of mild process cheese analog

Example 2 was duplicated except that the amount of the fat-free cheese analog was increased to 285 lbs., the amount of natural cheddar cheese was reduced to 15 lbs., all 270 days old, and the nonfat dry milk and dried whey were replaced with 17½ lbs. modified (partially delactosed, partially demineralized) whey. The cooled product also possessed the texture and flavor associated with natural process American-style cheese, but was manufactured at a lower cost than the product in Example 2.

EXAMPLE 4

Preparation of sharp process cheese analog

Example 2 was again duplicated except that 40 lbs. of 270-day-old cheddar cheese and 16 lbs. of 30-day-old cheddar cheese were used, rework (previously processed cheese analog) was increased from 10 to 20 lbs. and 5 lbs. of enzyme modified cheese was added. The cooled product possessed a firmer texture than the product of Example 2 and had a sharp flavor associated with process American-style cheese manufactured from selected, aged cheddar cheese.

EXAMPLE 5

Preparation of hot pepper process cheese analog

Example 2 was again duplicated except that the cheddar cheese consisted of 56¼ lbs. 30-day-old cheddar, and 21 lbs. comminuted Jalapeno pepper and 9 ozs. of pepper flakes were introduced into the batch. The cheese color was eliminated. The cooled product possessed the texture and spicy flavor associated with natural process hot pepper cheese.

EXAMPLE 6

Preparation of Caraway process cheese analog

Example 2 was again duplicated except that the cheddar cheese was replaced with 56½ lbs. of Swiss cheese, the amount of liquid corn oil was decreased to 35 lbs. and the amount of partially hydrogenated vegetable oil was increased to 35 lbs., 5 lbs. of caraway seed and 15 ozs. of essence of caraway were added, and rework amount was increased to 20 lbs. The cooled product possessed the texture and flavor associated with natural process caraway cheese.

EXAMPLE 7

Preparation of smoke flavored process cheese analog

The procedure of Example 2 was again duplicated except that the following changes in ingredients and amounts were made:

The amount of fat-free cheese analog was reduced to 238 lbs.

The hydrogenated oil was replaced wit 25 lbs. additional corn oil.

The dried whey was eliminated and the non-fat dry milk was increased to 21¾ lbs. total.

7 lbs. of the sodium citrate was replaced by di-sodium phosphate.

4 ozs. of flavors and spices.

The resultant fluent thermoplastic mass was then cast into 4 lbs., 14 oz. rectangular loaves which were cut lengthwise after they solidified. The product was then smoked in a smoke house at 70° for approximately 12 hours. The product produced had the texture and flavor associated with natural smoked process cheese.

EXAMPLE 8

Preparation of Romano-type process cheese analog

Example 2 was again duplicated except that the amount of partially hydrogenated vegetable oil was increased to 61 lbs., rework was increased to 25 lbs. and the amount of non-fat dry milk was increased to 13 lbs. The liquid corn oil and dried whey were not used. In addition, 6 lbs. of enzyme modified cheese and 2½ lbs. of titanium dioxide were added. The cooled product possessed the firm, dry texture and sharp flavor associated with natural Romano cheese. In addition the product was readily gratable.

EXAMPLE 9

Preparation of mozzarella style process cheese analog

Example 2 was again duplicated except that 300 lbs. of fat-free cheese analog was used, the cheddar cheese, rework and cheese color were eliminated, the partially hydrogenated vegetable oil was increased to 69 lbs. and the liquid corn oil was decreased to 1 lb. The non-fat dry milk and dried whey were replaced with 12½ lbs. calcium caseinate. The cooled product possessed the smooth, resilient texture and mild flavor of natural mozzarella cheese. Further, the product shredded without crumbling and upon heating exhibited a stringy character.

EXAMPLE 10

Preparation of a Provolone-style process cheese analog

Example 2 was again duplicated except that the amount of the fat-free cheese analog was increased to 280 lbs., non-fat dry milk was increased to 15 lbs., dried whey was decreased to 7 lbs. and 5 ozs. natural flavors and spices were replaced with smoke flavor. The fluent thermoplastic mass was cast in 10 lb. cylindrical molds and cooled to approximately 45° F. causing the mass to set into a form retaining state. The cooled product possessed the smooth, somewhat plastic texture and mild lightly smoked flavor associated with natural Provolone cheese.

We claim:

1. A method of making a process cheese analog resembling processed natural cheese in texture, flavor and body comprising the steps of:
   a. producing a substantially fat-free natural cheese analog from a mixture of a dry casein material and a liquid cheese whey conditioned by the addition thereto of a material selected from the group consisting of sodium hydroxide and calcium hydroxide including the steps of acidifying the mixture, adding a coagulating enzyme to the mixture to form a cheese-like curd, cutting, draining and pressing the curd;
   b. comminuting the fat-free cheese analog;
   c. adding a quantity of a selected fat to the comminuted cheese analog;
   d. adding a quantity of emulsifier to the comminuted cheese analog in an amount sufficient to increase the softness and meltability of the resultant process cheese analog;
   e. heating the fat and cheese analog mixture to a temperature between about 155°–205° F. until it forms a fluent mass; and
   f. casting the fluent mass into any desired shape.

2. A method of making a process cheese analog as claimed in claim 1 wherein the selected fat is a vegetable oil.

3. A method of making a process cheese analog as claimed in claim 2 wherein the vegetable oil is selected from the group consisting of corn oil, soybean oil, safflower oil, cottonseed oil, palm oil and combinations thereof.

4. A method of making a process cheese analog as claimed in claim 1 wherein during the heating step the fat and cheese analog mixture is heated to between 180° and 185° F.

5. A method of making a process cheese analog as claimed in claim 1 wherein an amount of natural cheese is added as a flavoring to the fluent mass of fat and cheese analog.

6. A method of making a process cheese analog as claimed in claim 1 further including before the comminuting step the step of storing the fat-free cheese analog for a time period so that the flavor may develop.

7. A method of making a process cheese analog as claimed in claim 1 which further includes adding selected vitamins and minerals to the comminuted cheese analog.

8. A method of making a process cheese analog as claimed in claim 1 wherein the emulsifier is sodium citrate and wherein the sodium citrate increases the metability of the resultant process cheese analog.

9. A method of making a process cheese analog as claimed in claim 8 wherein the adding step further includes adding at least one other emulsifier to the comminuted cheese analog.

10. A method of making a process cheese analog as claimed in claim 1 wherein the adding step further includes adding a quantity of rework from previous production of process cheese analog to the comminuted cheese analog.

11. A method of making a process cheese analog as claimed in claim 1 wherein the adding step further includes adding a quantity of selected spices and flavorings to the comminuted cheese analog.

* * * * *

UNITED STATES PATENT AND TRADEMARK OFFICE
CERTIFICATE OF CORRECTION

PATENT NO. : 4,459,313
DATED : July 10, 1984
INVENTOR(S) : Swanson et al.

It is certified that error appears in the above-identified patent and that said Letters Patent are hereby corrected as shown below:

At column 1, at line 31, cancel "negregated" and substitute therefor --segregated--.

At column 2, line 11, cancel "3,618,109" and substitute therefor --3,818,109--.

At column 6, line 28, cancel "these" and substitute therefor --those--.

At column 6, line 58, cancel "completly reversel" and substitute therefor --completely reversed--.

At column 12, line 18, cancel "metability" and substitute therefor --meltability--.

Signed and Sealed this

Thirteenth Day of November 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,459,313

DATED : July 10, 1984

INVENTOR(S) : Arthur M. Swanson

It is certified that error appears in the above-identified patent and that said Letters Patent is hereby corrected as shown below:

The term of this patent subsequent to January 1 1997, has been disclaimed.

Signed and Sealed this

Twelfth Day of August 1986

[SEAL]

Attest:

DONALD J. QUIGG

Attesting Officer         Commissioner of Patents and Trademarks